US010320038B2

(12) United States Patent
Nomura et al.

(10) Patent No.: US 10,320,038 B2
(45) Date of Patent: Jun. 11, 2019

(54) CHARGING METHOD FOR LITHIUM ION SECONDARY BATTERY AND CHARGING CONTROL SYSTEM THEREFOR, AND ELECTRONIC APPARATUS AND BATTERY PACK HAVING CHARGING CONTROL SYSTEM

(71) Applicant: Maxell Holdings, Ltd., Otokuni-gun, Kyoto (JP)

(72) Inventors: Hirokazu Nomura, Osaka (JP); Kunihiko Koyama, Osaka (JP)

(73) Assignee: MAXELL HOLDINGS, LTD., Kyoto (JP)

( * ) Notice: Subject to any disclaimer, the term of this patent is extended or adjusted under 35 U.S.C. 154(b) by 23 days.

(21) Appl. No.: 15/533,306

(22) PCT Filed: Dec. 10, 2015

(86) PCT No.: PCT/JP2015/084639
§ 371 (c)(1),
(2) Date: Jun. 5, 2017

(87) PCT Pub. No.: WO2016/104163
PCT Pub. Date: Jun. 30, 2016

(65) Prior Publication Data
US 2018/0013179 A1  Jan. 11, 2018

(30) Foreign Application Priority Data
Dec. 25, 2014 (JP) .................. 2014-263460

(51) Int. Cl.
*H02J 7/04* (2006.01)
*H02J 7/00* (2006.01)
(Continued)

(52) U.S. Cl.
CPC ......... *H01M 10/448* (2013.01); *H01M 4/587* (2013.01); *H01M 10/0525* (2013.01);
(Continued)

(58) Field of Classification Search
CPC ........ H02J 7/044; H02J 7/0073; H01M 10/46; H01M 10/448
(Continued)

(56) References Cited

U.S. PATENT DOCUMENTS 5,710,506 A * 1/1998 Broell .................. H02J 7/0073
320/145
2009/0259420 A1 10/2009 Greening et al.
(Continued)

FOREIGN PATENT DOCUMENTS

JP       7-296853 A    11/1995
JP    2005-185060 A     7/2005
(Continued)

OTHER PUBLICATIONS

International Search Report issued in PCT/JP2015/084639 (PCT/ISA/210), dated Mar. 1, 2016.
(Continued)

*Primary Examiner* — Edward Tso
*Assistant Examiner* — Aaron Piggush
(74) *Attorney, Agent, or Firm* — Birch, Stewart, Kolasch & Birch, LLP

(57) ABSTRACT

A method for charging a lithium ion secondary battery of the present invention includes a first step and a second step. In the first step, A, B, and C satisfy the relationship A>B and B<C, where A represents an average charging current value in the range where a charge rate of the lithium ion secondary battery is 0% or more and less than 40%, B represents an average charging current value in the range where the charge rate is 40% or more and 60% or less, and C represents an
(Continued)

average charging current value in the range where the charge rate is more than 60%. In the first step, the ratio of $C_{MAX}$ to $C_{MIN}$ ($C_{MAX}/C_{MIN}$) is 1.01 to 3.00, where $C_{MAX}$ represents the maximum value of the charging current value and $C_{MIN}$ represents the minimum value of the charging current value.

13 Claims, 4 Drawing Sheets

(51) Int. Cl.
    *H01M 10/44*     (2006.01)
    *H01M 10/0525*     (2010.01)
    *H01M 10/46*     (2006.01)
    *H01M 4/587*     (2010.01)

(52) U.S. Cl.
    CPC ........... *H01M 10/44* (2013.01); *H01M 10/46* (2013.01); *H02J 7/007* (2013.01); *H02J 7/044* (2013.01); *Y02B 40/90* (2013.01)

(58) Field of Classification Search
    USPC .................................. 320/134, 145, 157, 164
    See application file for complete search history.

(56) References Cited

U.S. PATENT DOCUMENTS

| | | |
|---|---|---|
| 2011/0012563 A1 | 1/2011 | Paryani et al. |
| 2011/0107120 A1 | 5/2011 | Nakashima |
| 2011/0267009 A1 | 11/2011 | Nakatsuji et al. |
| 2014/0253023 A1 | 9/2014 | Paryani et al. |
| 2014/0375279 A1 | 12/2014 | Nishino et al. |
| 2015/0171644 A1 | 6/2015 | Paryani et al. |

FOREIGN PATENT DOCUMENTS

| | | |
|---|---|---|
| JP | 2009-158142 A | 7/2009 |
| JP | 2009-302038 A | 12/2009 |
| JP | 2011-4509 A | 1/2011 |
| JP | 2011-24412 A | 2/2011 |
| JP | 2011-97809 A | 5/2011 |
| JP | 2014-22280 A | 2/2014 |
| JP | 2014-68467 A | 4/2014 |
| JP | 2014-120200 A | 6/2014 |
| WO | WO2013/046690 A1 | 4/2013 |

OTHER PUBLICATIONS

Levi et al., "Diffusion Coefficients of Lithium Ions during Intercalation into Graphite Derived from the Simultaneous Measurements and Modeling of Electrochemical Impedance and Potentiostatic Intermittent Titration Characteristics of Thin Graphite Electrodes", The Journal of Physical Chemistry B, vol. 101, 1997, pp. 4641-4647.

\* cited by examiner

CHARGING METHOD FOR LITHIUM ION SECONDARY BATTERY AND CHARGING CONTROL SYSTEM THEREFOR, AND ELECTRONIC APPARATUS AND BATTERY PACK HAVING CHARGING CONTROL SYSTEM

TECHNICAL FIELD

The present invention relates to a charging method for a lithium ion secondary battery and a charging control system therefor, and an electronic apparatus and a battery pack that include the charging control system.

BACKGROUND ART

A lithium ion secondary battery, which is a kind of nonaqueous electrolyte secondary battery, is characterized by high voltage and high capacity, and therefore has been widely used. In order to achieve more effective use of the lithium ion secondary battery, various modifications have also been made to its charging method. The charging method for the lithium ion secondary battery is generally constant-current constant-voltage (CCCV) charging.

The CCCV charging is performed as shown in FIG. 6. In FIG. 6, the horizontal axis represents time and the vertical axis represents a voltage, a current, and a temperature. FIG. 6 shows changes in the voltage and the temperature when a battery is charged by controlling the current as indicated by the graph. In the early stage of charging, constant-current (CC) charging is performed. Specifically, a battery is charged with a constant current of, e.g., about 0.7C to 1C. In this case, a current value at which a fully charged battery can be discharged in one hour is defined as 1C. The CC charging is continued until the voltage of the battery is increased with charging and reaches a predetermined set voltage $V_C$, e.g., 4.2 V. Then, the CC charging is switched to constant-voltage (CV) charging when the voltage has reached the set voltage $V_C$, and the CV charging is performed while the charging current is reduced to maintain the set voltage $V_C$.

In recent years, the current during the CC charging needs to be as large as possible so that the CCCV charging can be performed in a short time. The amount of charge is the integral of the charging current with respect to time. Therefore, the process of increasing the charging current is effective in reducing the charging time. However, the charging involves the generation of heat, and the amount of heat generated increases with an increase in the current. Moreover, it is known that the charge-discharge cycle characteristics of the lithium ion secondary battery are reduced when it is charged in the high temperature environment. For this reason, various quick charging methods have been proposed, which prevent the degradation of battery characteristics.

For example, Patent Document 1 proposes a charging method for a nonaqueous electrolyte secondary battery. In this method, first, the battery is charged with a constant current until a specified charging voltage. Then, the battery is charged in a stepwise manner, while the charging current is gradually reduced. Thus, the nonaqueous electrolyte secondary battery, which has a high battery voltage, can be quickly charged and maintain good cycle characteristics.

Patent Document 2 proposes a charging method for a lithium ion battery. In this method, the initial charging current is sufficiently larger than 1CA, and then the charging current is gradually reduced. Thus, the lithium ion battery can be charged in a short time and ensure the durability.

Patent Document 3 proposes a charging method for a battery. In this method, a battery voltage and a battery surface temperature are measured before the battery is charged. When the battery voltage indicates that the depth of charge is 50% or less, and the battery surface temperature is 0° C. to 60° C., constant-current charging is performed at a predetermined current value, and then constant-current constant-voltage charging is performed at a current value smaller than that current value. Thus, the cycle characteristics of the battery can be maintained while ensuring a sufficient discharge capacity in a short time.

Patent Document 4 proposes a charging system for a lithium ion battery. The charging system uses a specific variable charge-profile to apply a charging voltage and a charging current to the battery. Thus, the charging time of the lithium ion battery can be further reduced while suppressing or eliminating the influence of quick charging on the cycle life.

On the other hand, the relationship between the state of charge of a lithium ion secondary battery and the diffusion coefficient of lithium ions in a negative electrode has become clear recently (see Non-Patent Document 1). In the present specification, the diffusion coefficient of lithium ions in a negative electrode means a physical constant representing the ease of movement of lithium ions in a negative electrode, and is determined by the type of negative electrode active material. FIG. 5 of Non-Patent Document 1 shows the relationship between the state of charge and the diffusion coefficient of lithium ions when graphite is used as a negative electrode active material. It is evident from FIG. 5 of Non-Patent Document 1 that the diffusion coefficient of lithium ions varies with the state of charge for a graphite negative electrode.

In general, the movement of lithium ions during the charging of the lithium ion secondary battery is limited on the negative electrode side. Therefore, even if the charging current is increased to shorten the charging time, the charging efficiency is reduced when the charging current exceeds the ability of the negative electrode to accept lithium ions. This increases the amount of heat generated by the battery and leads to the degradation of the battery characteristics. In this case, the ability of the negative electrode to accept lithium ions is considered to depend on the diffusion coefficient of lithium ions in the negative electrode. Thus, if a charging method can be developed by taking into account the diffusion coefficient of lithium ions in the negative electrode, the charging method would be efficient and prevent the degradation of the battery characteristics.

PRIOR ART DOCUMENTS

Patent Documents

Patent Document 1: JP H7 (1995)-296853 A
Patent Document 2: JP 2005-185060 A
Patent Document 3: JP 2009-158142 A
Patent Document 4: JP 2011-024412 A Non-Patent Documents Non-Patent Document 1: J. Phys. Chem. B 1997, 101, 4641-4647

DISCLOSURE OF INVENTION

Problem to be Solved by the Invention

However, a charging method taking into account the diffusion coefficient of lithium ions in the negative electrode has not been developed, as indicated by Patent Documents 1 to 4.

With the foregoing in mind, the present invention provides a charging method taking into account the diffusion coefficient of lithium ions in a negative electrode.

Means for Solving Problem

A method for charging a lithium ion secondary battery of the present invention includes a first step of charging the lithium ion secondary battery by increasing or decreasing a charging current until a predetermined set voltage, and a second step of charging the lithium ion secondary battery that has reached the set voltage with a constant voltage while decreasing the charging current to maintain the set voltage. In the first step, A, B, and C satisfy a relationship A>B and B<C, where A represents an average charging current value in a range where a charge rate of the lithium ion secondary battery is 0% or more and less than 40%, B represents an average charging current value in a range where the charge rate is 40% or more and 60% or less, and C represents an average charging current value in a range where the charge rate is more than 60%. In the first step, a ratio of $C_{MAX}$ to $C_{MIN}$ ($C_{MAX}/C_{MIN}$) is 1.01 to 3.00, where $C_{MAX}$ represents a maximum value of the charging current value and $C_{MIN}$ represents a minimum value of the charging current value.

A charging control system for a lithium ion secondary battery of the present invention includes a charging algorithm that includes a first step of charging the lithium ion secondary battery by increasing or decreasing a charging current until a predetermined set voltage, and a second step of charging the lithium ion secondary battery that has reached the set voltage with a constant voltage while decreasing the charging current to maintain the set voltage. In the first step, A, B, and C satisfy a relationship A>B and B<C, where A represents an average charging current value in a range where a charge rate of the lithium ion secondary battery is 0% or more and less than 40%, B represents an average charging current value in a range where the charge rate is 40% or more and 60% or less, and C represents an average charging current value in a range where the charge rate is more than 60%. In the first step, a ratio of $C_{MAX}$ to $C_{MIN}$ ($C_{MAX}/C_{MIN}$) is 1.01 to 3.00, where $C_{MAX}$ represents a maximum value of the charging current value and $C_{MIN}$ represents a minimum value of the charging current value.

An electronic apparatus of the present invention includes the charging control system for a lithium ion secondary battery of the present invention.

A battery pack of the present invention includes the charging control system for a lithium ion secondary battery of the present invention.

Effects of the Invention

The present invention can provide a charging method and a charging control system for a lithium ion secondary battery, both of which are capable of suppressing the generation of heat by the battery during charging, charging the battery with high efficiency, and reducing the charging time without impairing the battery characteristics.

Figure 1:
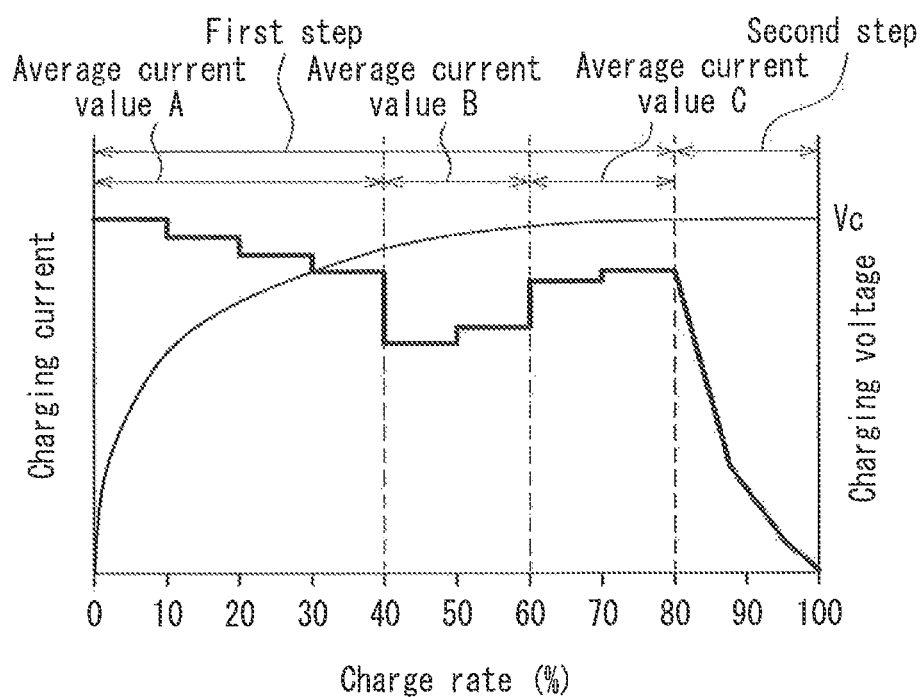
FIG. 1 is a diagram illustrating an example of a charging method of the present invention.

DESCRIPTION OF THE INVENTION (Charging Method for Lithium Ion Secondary Battery of the Present Invention)

The present inventors studied in detail the relationship between the state of charge (SOC) of a graphite negative electrode and the diffusion coefficient of lithium ions in the graphite negative electrode. As a result, the present inventors found out that the diffusion coefficient of lithium ions in the graphite negative electrode showed the maximum value in a range where a charge rate was 0% or more and less than 40%, the minimum value in a range where the charge rate was 40% or more and 60% or less, and the intermediate value between the maximum value and the minimum value in a range where the charge rate was more than 60%.

Then, the present inventors improved the conventional charging method in the CC charging period of the CCCV charging, and employed a charging method in which the charging current was increased or decreased for each range of the charge rate, as described above. In this manner, the present inventors have completed a method for charging a lithium ion secondary battery of the present invention, which is capable of suppressing the generation of heat by the battery during charging, charging the battery with high efficiency, and reducing the charging time without impairing the battery characteristics.

The method for charging a lithium ion secondary battery of the present invention (referred to as a charging method of the present invention in the following) includes a first step and a second step. In the first step, the lithium ion secondary battery is charged by increasing or decreasing a charging current until a predetermined set voltage. In the second step, the lithium ion secondary battery that has reached the set voltage is charged with a constant voltage while the charging current is decreased to maintain the set voltage. Moreover, in the first step, A, B, and C satisfy the relationship A>B and B<C, where A represents an average charging current value in the range where a charge rate of the lithium ion secondary battery is 0% or more and less than 40%, B represents an average charging current value in the range where the charge rate is 40% or more and 60% or less, and C represents an average charging current value in the range where the charge rate is more than 60%. Further, in the first step, the ratio of $C_{MAX}$ to $C_{MIN}$ ($C_{MAX}/C_{MIN}$) is 1.01 to 3.00, where $C_{MAX}$ represents the maximum value of the charging current value and $C_{MIN}$ represents the minimum value of the charging current value.

Since the charging method of the present invention includes the first step, the average charging current value B in the range where the diffusion coefficient of lithium ions in the negative electrode is smallest (i.e., in the range where the charge rate is 40% or more and 60% or less) is less than the average charging current value A in the range where the diffusion coefficient of lithium ions in the negative electrode is largest (i.e., in the range where the charge rate is 0% or more and less than 40%) and the average charging current value C in the range where the diffusion coefficient of lithium ions in the negative electrode is second largest (i.e., in the range where the charge rate is more than 60%). Due to this relationship, the generation of heat by the battery during charging can be minimized, so that the battery can be charged with high efficiency. Thus, the charging method of the present invention can reduce the charging time without impairing the battery characteristics such as the charge-discharge cycle characteristics of the battery.

In this case, the charge rate of a fully discharged battery is 0%, and the charge rate of a fully charged battery is 100%. The total amount of charge is obtained by integrating the charging current over the charging time when the charge rate is 100%. The charge rate means the ratio of the amount of charge to the total amount of charge. Moreover, the charge rate can be accurately measured by monitoring the charging of a fully discharged battery with the use of a commercially available battery fuel gauge IC.

In the first step, the minimum value $C_{MIN}$ of the charging current value is set in the range where the charge rate is 40% or more and 60% or less. However, in order to remove some faults, e.g., the charging current value may be temporarily reduced in the range where the charge rate is 0% or more and less than 40%. Consequently, even if the minimum value of the charging current value is present in the range where the charge rate is 0% or more and less than 40%, the above relationship A>B and B<C will be established.

When the charge rate of the battery at the beginning of the charging process in the first step is 40% or more and 60% or less, i.e., when the battery to be charged is not in a fully discharged state, only B<C needs to be established. From a practical point of view, the charge rate of the battery that is not in a fully discharged state can be estimated from the voltage of the battery. In this case, using a fully discharged battery with the same specification, a relationship between the battery voltage and the charge rate has previously been determined. Then, the voltage of the battery that is not in a fully discharged state is applied to this relationship, and thus the charge rate of the battery can be estimated. In some cases, the detection of the charge rate of the battery at the beginning of the charging process can eliminate the step of charging the battery with the average charging current value A or can reduce the time required to charge the battery with the average charging current value A. Accordingly, the whole charging time can further be shortened.

The maximum value $C_{MAX}$ is preferably 0.4C to 4.0C, and the minimum value $C_{MIN}$ is preferably 0.2C to 2.0C. This allows the battery to be charged more efficiently.

The charging method of the present invention can be used most appropriately when the negative electrode active material is composed of only graphite. However, the charging method of the present invention can be used as long as the negative electrode active material includes at least graphite. Moreover, the charging method of the present invention can be used more appropriately when the negative electrode active material includes 40% by mass or more of graphite. This is because, although the relationship between the charge rate of the battery and the diffusion coefficient of lithium ions may vary to some extent depending on the amount of graphite in the negative electrode active material, the diffusion coefficient of lithium ions in the entire negative electrode is significantly affected by the diffusion coefficient of lithium ions in graphite.

Examples of the negative electrode active material other than graphite, which can be used for the negative electrode, include a negative electrode material containing silicon (Si). The negative electrode material may be a composite material ($SiO_x$) having a structure in which Si ultrafine particles are dispersed in $SiO_2$. In the composite material ($SiO_x$), the atom ratio x of oxygen to Si is generally $0.5 \leq x \leq 1.5$. This composite material may further be coated with carbon to provide a composite material ($SiO_x$—C).

Next, the charging method of the present invention will be described based on the drawings. FIG. 1 is a diagram illustrating an example of the charging method of the present invention. In FIG. 1, the horizontal axis represents a charge rate (%) and the vertical axis represents a charging voltage and a charging current. As shown in FIG. 1, the charging method of the present invention includes a first step of charging the lithium ion secondary battery by increasing or decreasing a charging current until a predetermined set voltage $V_C$, and a second step of charging the lithium ion secondary battery that has reached the set voltage $V_C$ with a constant voltage while decreasing the charging current to maintain the set voltage $V_C$. In the first step, A, B, and C satisfy the relationship A>B and B<C, where A represents an average charging current value in the range where a charge rate of the lithium ion secondary battery is 0% or more and less than 40%, B represents an average charging current value in the range where the charge rate is 40% or more and 60% or less, and C represents an average charging current value in the range where the charge rate is more than 60%. Moreover, in the first step, the charging current value is defined so that the ratio of $C_{MAX}$ to $C_{MIN}$ ($C_{MAX}/C_{MIN}$) is 1.01 to 3.0, where $C_{MAX}$ represents the maximum value of the charging current value and $C_{MIN}$ represents the minimum value of the charging current value.

The set voltage $V_C$ is not particularly limited, and may be, e.g., 4.2 to 4.5 V. Moreover, in terms of increasing the charge capacity and improving the energy density of the battery, the set voltage $V_C$ can be 4.6 V or more. In FIG. 1, the charge rate is 80% when the first step is finished and the second step (CV charging) is started. However, the charge rate is not limited thereto, and can be set to 70% to 90% at the time of starting the second step (CV charging).

In the charging method of the present invention, the operation after the transition from the first step to the second step is the same as the conventional CCCV charging.

In the charging method of the present invention, the charging time varies with the capacity of the lithium ion secondary battery and is generally about 0.5 to 2 hours. The above charging operation is finished when the charge rate of the battery has reached 100%, and the current value at this time is typically 0.1C or less.

The charging method of the present invention can use any charging apparatus that is capable of performing the charging method, but preferably uses a charging apparatus that has a charging control system for a lithium ion secondary battery of the present invention, which will be described later.

(Charging Control System for Lithium Ion Secondary Battery of the Present Invention)

A charging control system for a lithium ion secondary battery of the present invention (referred to as a charging control system of the present invention in the following) includes a charging algorithm that includes a first step and a second step. In the first step, the lithium ion secondary battery is charged by increasing or decreasing a charging current until a predetermined set voltage. In the second step, the lithium ion secondary battery that has reached the set voltage is charged with a constant voltage while the charging current is decreased to maintain the set voltage. Moreover, in the first step, A, B, and C satisfy the relationship A>B and B<C, where A represents an average charging current value in the range where a charge rate of the lithium ion secondary battery is 0% or more and less than 40%, B represents an average charging current value in the range where the charge rate is 40% or more and 60% or less, and C represents an average charging current value in the range where the charge rate is more than 60%. Further, in the first step, the ratio of $C_{MAX}$ to $C_{MIN}$ ($C_{MAX}/C_{MIN}$) is 1.01 to 3.00, where $C_{MAX}$ represents the maximum value of the charging current value and $C_{MIN}$ represents the minimum value of the charging current value.

The charging control system of the present invention includes the charging algorithm for performing the charging method of the present invention. Therefore, the generation of heat by the battery during charging can be minimized, so that the battery can be charged with high efficiency. Thus, the charging control system of the present invention can reduce the charging time without impairing the battery characteristics such as the charge-discharge cycle characteristics of the battery.

Figure 2:
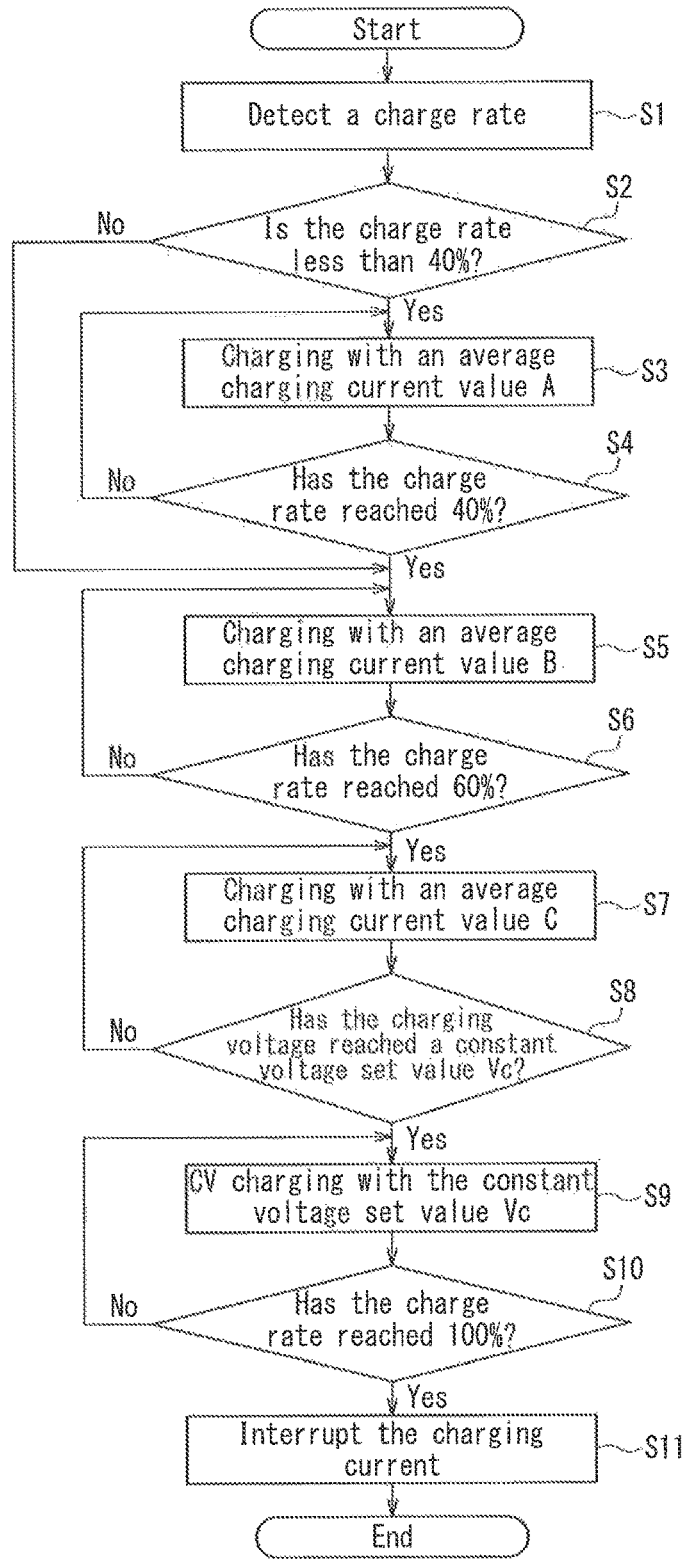
FIG. 2 is a flow chart illustrating a charging algorithm of the present invention.

The charging algorithm is substantially the same as the procedure of the charging method of the present invention. FIG. 2 is a flow chart illustrating the charging algorithm.

As shown in FIG. 2, when the charging is started, first, the charge rate of a battery is detected (step S1). Then, it is determined whether the detected charge rate is less than 40% (step S2). If the charge rate is less than 40% (step S2: Yes), the battery is charged with an average charging current value A (step S3). If the charge rate reaches 40% (step S4: Yes), the battery is charged with an average charging current value B (step S5). If the charge rate reaches 60% (step S6: Yes), the battery is charged with an average charging current value C (step S7). With this step, if the charging voltage reaches a constant voltage set value $V_C$ (step S8: Yes), the CV charging is performed at the constant voltage set value $V_C$ (step S9). With this step, if the charge rate reaches 100% (step S10: Yes), the charging current is interrupted (step S11), and the charging is finished. Although not shown in FIG. 2, the ratio of $C_{MAX}$ to $C_{MIN}$ ($C_{MAX}/C_{MIN}$) is set to 1.01 to 3.00, where $C_{MAX}$ represents the maximum value of the charging current value and $C_{MIN}$ represents the minimum value of the charging current value until the charging voltage reaches the constant voltage set value $V_C$.

The charging control system of the present invention can take any form that includes the above charging algorithm. For example, one form of the charging control system may include a charging apparatus for charging a lithium ion secondary battery. The charging apparatus may include a circuit that uses the charging algorithm to charge the lithium ion secondary battery by applying a charging current and a charging voltage to the battery.

Another form of the charging control system may include an electronic system that controls a charging apparatus for charging a lithium ion secondary battery. The electronic system may include various types of hardware such as a central processing unit (CPU), a microprocessor, a microcontroller, and a system-on-chip (SOC). The electronic system may also include a computer system that is programmed based on the charging algorithm.

(Electronic Apparatus of the Present Invention)

An electronic apparatus of the present invention includes the charging control system of the present invention. The electronic apparatus of the present invention can take any form that includes the charging control system of the present invention. Examples of the electronic apparatus include various types of mobile devices including the charging control system of the present invention.

(Battery Pack of the Present Invention)

A battery pack of the present invention includes the charging control system of the present invention. The battery pack of the present invention can take any form that includes the charging control system of the present invention. For example, the battery pack may include a lithium ion secondary battery, the charging control system of the present invention, a PTC element, a protection circuit, etc.

EXAMPLES

Hereinafter, the present invention will be described in detail by way of examples. However, the present invention is not limited to the following examples.

First, a lithium ion secondary battery was produced in the following manner.

<Production of Positive Electrode>

96.5 parts by mass of $LiCoO_2$ as a positive electrode active material, 20 parts by mass of N-methyl-2-pyrrolidone (NMP) solution containing polyvinylidene difluoride (PVDF) at a concentration of 10% by mass as a binder, and 1.5 parts by mass of acetylene black as a conducive assistant were kneaded with a two-axis kneader. Then, NMP was further added to adjust the viscosity of the mixture. Thus, a paste containing a positive electrode mixture was prepared.

The positive electrode mixture containing paste was applied to both sides of an aluminum foil (positive electrode current collector) with a thickness of 12 µm. The paste was then dried in vacuum at 120° C. for 12 hours so that a positive electrode mixture layer was formed on each side of the aluminum foil. Subsequently, the thickness and density of each of the positive electrode mixture layers were adjusted by pressing, and a nickel lead was welded to an exposed portion of the aluminum foil. Thus, a strip-shaped positive electrode with a length of 640 mm and a width of 65 mm was produced. The thickness of the positive electrode mixture layer on one side of the aluminum foil was 65 µm.

<Production of Negative Electrode>

Graphite A and graphite B were mixed at a mass ratio of 30:70. The graphite A had an average particle diameter D50% of 22 µm, an interplanar spacing $d_{002}$ of 0.338 nm, and a specific surface area (measured by a BET method) of 3.8 $m^2/g$. In the graphite A, the surface was not coated with an amorphous carbon. The graphite B had an average particle diameter D50% of 18 µm, an interplanar spacing $d_{002}$ of 0.336 nm, and a specific surface area (measured by a BET method) of 3.9 $m^2/g$. In the graphite B, the surface of mother particles of graphite was coated with an amorphous carbon. 98 parts by mass of this graphite mixture, 1.0 part by mass of carboxymethyl cellulose (CMC) as a binder, and 1.0 part by mass of styrene-butadiene rubber (SBR) were mixed with ion exchanged water, and an aqueous paste containing a negative electrode mixture was prepared.

The negative electrode mixture containing paste was applied to both sides of a copper foil (negative electrode current collector) with a thickness of 6 µm. The paste was then dried in vacuum at 100° C. for 12 hours so that a negative electrode mixture layer was formed on each side of the copper foil. Subsequently, the thickness and density of each of the negative electrode mixture layers were adjusted by pressing, and a nickel lead was welded to an exposed portion of the copper foil. Thus, a strip-shaped negative electrode with a length of 640 mm and a width of 66 mm was produced. The thickness of the negative electrode mixture layer on one side of the copper foil was 70 μm.

<Preparation of Nonaqueous Electrolyte Solution>

Ethylene carbonate (EC) and diethyl carbonate (DEC) were mixed at a volume ratio of 3:7, and 3% by mass of vinylene carbonate was dissolved in this mixture to form a solution. Then, $LiPF_6$ was dissolved in the solution at a concentration of 1 mol/L, and thus a nonaqueous electrolyte solution was prepared.

<Assembly of Battery>

The strip-shaped positive electrode and the strip-shaped negative electrode were laminated via a polyethylene (PE) separator (with a thickness of 12 μm). This laminated body was spirally wound and then pressed into a flat shape. Thus, a wound electrode body having a flat wound structure was produced. The wound electrode body was fixed by a polypropylene insulating tape. Next, the wound electrode body was inserted into a square battery case that was made of aluminum alloy and had external dimensions of 5.5 mm thick, 51 mm wide, and 72 mm high. Moreover, a lead was welded and a cover plate made of aluminum alloy was welded to the opening edge of the battery case. Then, the nonaqueous electrolyte solution was injected through an inlet of the cover plate and allowed to stand still for an hour. Thereafter, the inlet was sealed, and thus a lithium ion secondary battery was obtained.

<Charging Process>

Next, the lithium ion secondary batteries thus produced were charged by the charging methods in Examples 1 to 4 and Comparative Examples 1 to 7, as shown in Tables 1 and 2. Each of the batteries was charged by increasing or decreasing a charging current until a set voltage $V_C$ (first step), and then CV charging was performed after the battery had reached the set voltage $V_C$ (second step). For the sake of convenience, the set voltage $V_C$ was a charging voltage when the charge rate reached 70%.

Tables 1 and 2 show the charging current in each range of the charge rate, an average charging current value A in the range where the charge rate is 0% or more and less than 40%, an average charging current value B in the range where the charge rate is 40% or more and 60% or less, an average charging current value C in the range where the charge rate is more than 60%, and the ratio of $C_{MAX}$ to $C_{MIN}$ ($C_{MAX}/C_{MIN}$), where $C_{MAX}$ represents the maximum value of the charging current value and $C_{MIN}$ represents the minimum value of the charging current value in the first step. Tables 1 and 2 also show the values of $C_{MAX}$ and $C_{MIN}$ expressed as a C-rate. In Tables 1 and 2, the charging current is expressed in amperes (A).

TABLE 1

| Charge rate (%) | Ex. 1 | Ex. 2 | Ex. 3 | Ex. 4 | Comp. Ex. 1 | Comp. Ex. 2 |
|---|---|---|---|---|---|---|
| 0-10 | 4.0 | 4.5 | 6.3 | 3.2 | 3.0 | 4.0 |
| 10-20 | 3.9 | 4.3 | 3.9 | 3.2 | 3.3 | 3.9 |
| 20-30 | 3.8 | 4.0 | 3.7 | 3.1 | 3.5 | 3.8 |
| 30-40 | 3.7 | 3.8 | 3.6 | 3.1 | 3.9 | 3.6 |
| 40-50 | 3.0 | 2.9 | 2.1 | 3.0 | 4.0 | 3.5 |
| 50-60 | 3.1 | 2.9 | 2.1 | 3.0 | 3.8 | 3.5 |
| 60-70 | 3.6 | 3.8 | 3.4 | 3.2 | 3.6 | 3.3 |
| 70-80 | 3.6-1.8 | 3.8-1.9 | 3.4-1.7 | 3.2-1.6 | 3.5-1.9 | 3.0-1.5 |
| 80-100 | 1.8-0.1 | 1.9-0.1 | 1.7-0.1 | 1.6-0.1 | 1.9-0.1 | 1.5-0.1 |
| Set voltage $V_C$ (V) | 4.35 | 4.35 | 4.35 | 4.35 | 4.35 | 4.35 |
| Average charging current value A | 3.9 | 4.2 | 4.4 | 3.2 | 3.4 | 3.8 |
| Average charging current value B | 3.1 | 2.9 | 2.1 | 3.0 | 3.9 | 3.5 |

TABLE 1-continued

| Charge rate (%) | Ex. 1 | Ex. 2 | Ex. 3 | Ex. 4 | Comp. Ex. 1 | Comp. Ex. 2 |
|---|---|---|---|---|---|---|
| Average charging current value C | 3.6 | 3.8 | 3.4 | 3.2 | 3.6 | 3.3 |
| $C_{MAX}/C_{MIN}$ | 1.33 | 1.55 | 3.00 | 1.07 | 1.33 | 1.21 |
| $C_{MAX}$ | 1.33 C | 1.50 C | 2.10 C | 1.07 C | 1.33 C | 1.33 C |
| $C_{MIN}$ | 1.00 C | 0.97 C | 0.70 C | 1.00 C | 1.00 C | 1.10 C |

TABLE 2

| Charge rate (%) | Comp. Ex. 3 | Comp. Ex. 4 | Comp. Ex. 5 | Comp. Ex. 6 | Comp. Ex. 7 |
|---|---|---|---|---|---|
| 0-10 | 4.5 | 2.9 | 6.5 | 3.0 | 3.6 |
| 10-20 | 4.3 | 2.9 | 3.9 | 3.0 | 3.6 |
| 20-30 | 4.0 | 2.9 | 3.6 | 3.0 | 3.6 |
| 30-40 | 3.8 | 3.0 | 3.5 | 3.0 | 3.6 |
| 40-50 | 3.8 | 3.2 | 2.1 | 3.0 | 3.6 |
| 50-60 | 3.9 | 3.0 | 2.1 | 3.0 | 3.6 |
| 60-70 | 2.9 | 3.1 | 3.4 | 3.0 | 3.6 |
| 70-80 | 2.9-1.4 | 3.0-1.4 | 3.4-1.6 | 3.0-1.8 | 3.6-2.0 |
| 80-100 | 1.4-0.1 | 1.4-0.1 | 1.6-0.1 | 1.8-0.1 | 2.0-0.1 |
| Set voltage $V_C$ (V) | 4.35 | 4.35 | 4.35 | 4.35 | 4.35 |
| Average charging current value A | 4.2 | 2.9 | 4.4 | 3.0 | 3.6 |
| Average charging current value B | 3.9 | 3.1 | 2.1 | 3.0 | 3.6 |
| Average charging current value C | 2.9 | 3.1 | 3.4 | 3.0 | 3.6 |
| $C_{MAX}/C_{MIN}$ | 1.55 | 1.10 | 3.10 | 1.00 | 1.00 |
| $C_{MAX}$ | 1.50 C | 1.06 C | 2.17 C | 1.00 C | 1.20 C |
| $C_{MIN}$ | 0.97 C | 0.97 C | 0.70 C | 1.00 C | 1.20 C |

<Evaluation of Charging Method>

The maximum temperature on the surface of each of the batteries in the charging process (referred to simply as the maximum temperature in the following) was measured. Moreover, the time it took for the charge rate to reach 80% from the start of charging of each of the batteries (referred to as the time required to reach 80%), and the time it took for the charge rate to reach 90% from the start of charging of each of the batteries (referred to as the time required to reach 90%) were measured.

<Evaluation of Battery>

The batteries in Examples 1 to 4 and Comparative Examples 1 to 7 were charged (set voltage $V_C$: 4.35 V, and end-of-charge current: 0.1 A) in the atmosphere at 23° C. by the charging methods in Examples 1 to 4 and Comparative Examples 1 to 7, respectively. Then, the batteries were discharged (final voltage: 2.75 V) with a constant current of 1C (3.0 A). This charging and discharging process was defined as 1 cycle, and the batteries were repeatedly charged and discharged for 500 cycles. Subsequently, a capacity retention rate of each of the batteries was calculated by the following formula.

Capacity retention rate (%)=(discharge capacity at the 500th cycle/discharge capacity at the 1st cycle)×100

Figure 3:
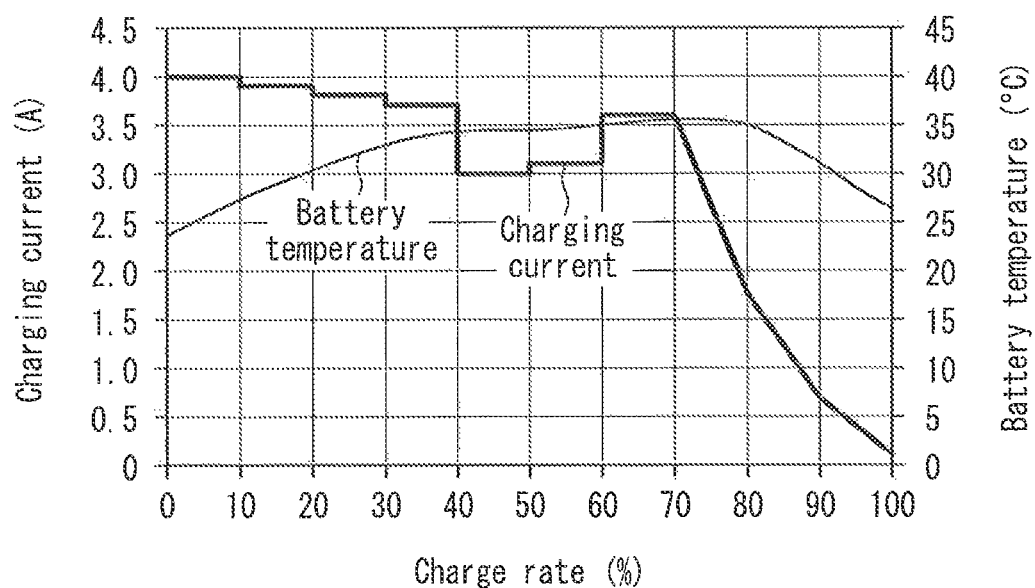
FIG. 3 is a diagram illustrating the relationship between a charge rate, a charging current, and a battery temperature of a battery in Example 1.
Figure 4:
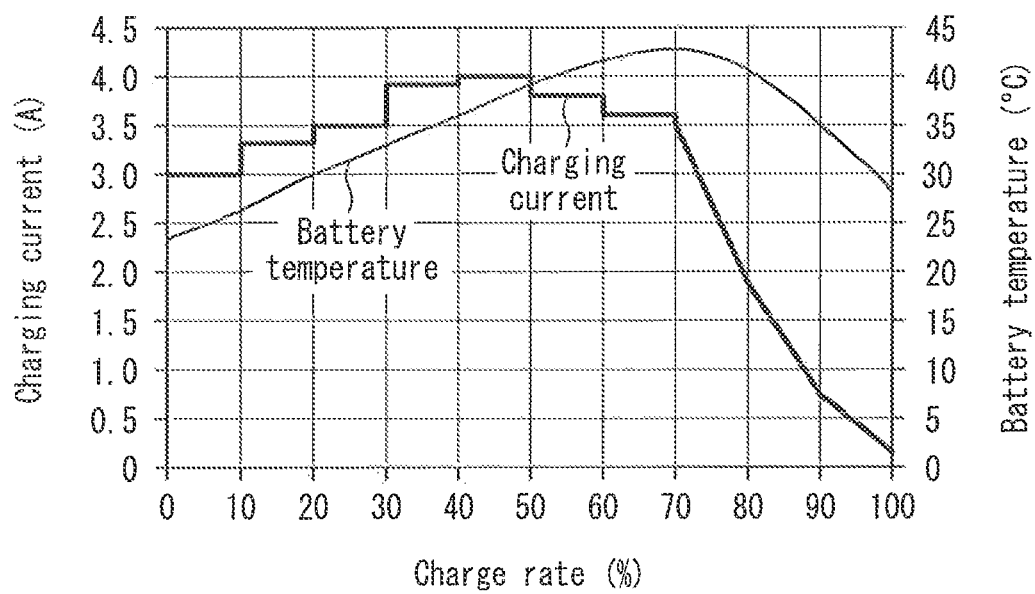
FIG. 4 is a diagram illustrating the relationship between a charge rate, a charging current, and a battery temperature of a battery in Comparative Example 1.
Figure 5:
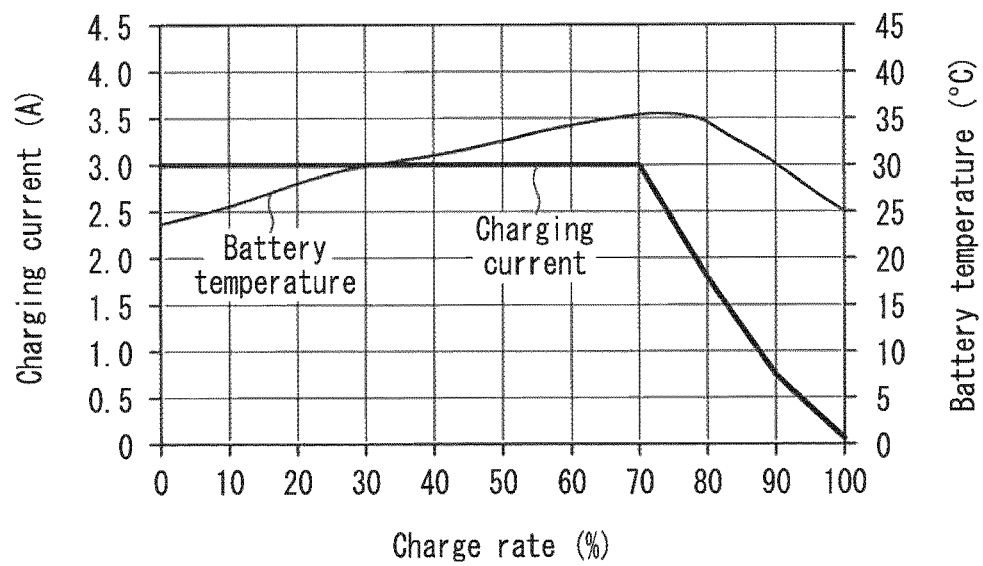
FIG. 5 is a diagram illustrating the relationship between a charge rate, a charging current, and a battery temperature of a battery in Comparative Example 6.
Figure 6:
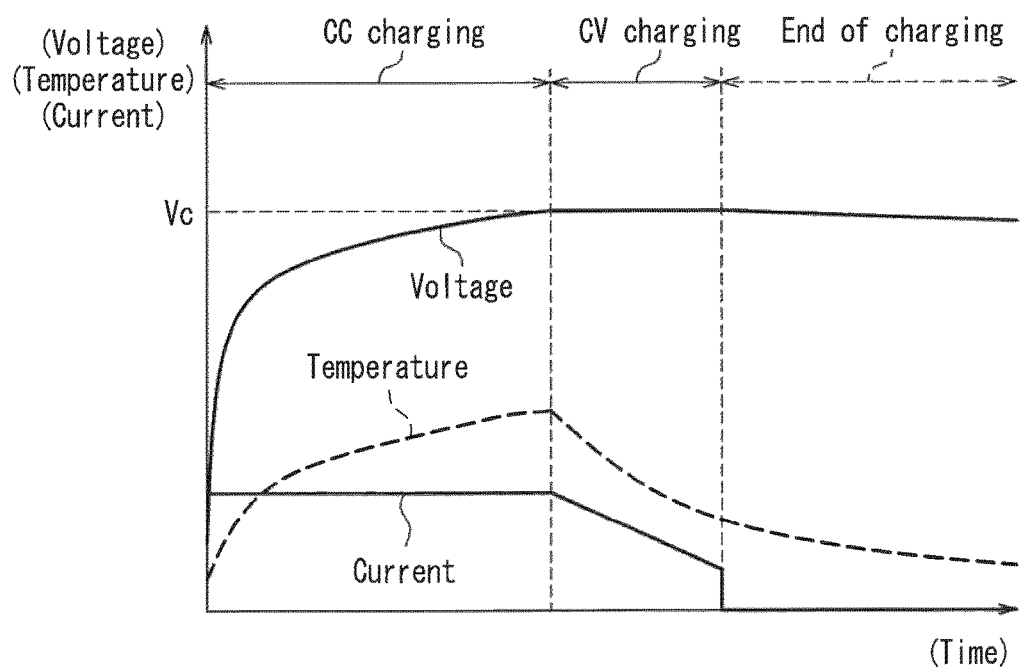
FIG. 6 is a diagram illustrating an example of conventional general constant-current constant-voltage (CCCV) charging.

Tables 3 and 4 show the results of the above evaluations. Moreover, FIG. 3 shows the relationship between the charge rate, the charging current, and the battery temperature of the battery in Example 1. FIG. 4 shows the relationship between the charge rate, the charging current, and the battery temperature of the battery in Comparative Example 1. FIG. 5 shows the relationship between the charge rate, the charging current, and the battery temperature of the battery in Comparative Example 6.

TABLE 3

|  | Ex. 1 | Ex. 2 | Ex. 3 | Ex. 4 | Comp. Ex. 1 | Comp. Ex. 2 |
|---|---|---|---|---|---|---|
| Maximum temperature (° C.) | 35.5 | 35.9 | 35.3 | 35.4 | 42.8 | 41.5 |
| Time required to reach 80% (min) | 41.0 | 40.6 | 41.6 | 48.2 | 40.9 | 41.3 |
| Time required to reach 90% (min) | 53.7 | 52.5 | 53.9 | 59.8 | 54.2 | 53.8 |
| Capacity retention rate (%) | 85 | 83 | 83 | 84 | 72 | 75 |

TABLE 4

|  | Comp. Ex. 3 | Comp. Ex. 4 | Comp. Ex. 5 | Comp. Ex. 6 | Comp. Ex. 7 |
|---|---|---|---|---|---|
| Maximum temperature (° C.) | 43.5 | 36.1 | 39.8 | 35.4 | 41.2 |
| Time required to reach 80% (min) | 40.9 | 49.1 | 41.3 | 49.2 | 41.9 |
| Time required to reach 90% (min) | 52.7 | 62.4 | 53.6 | 62.3 | 54.9 |
| Capacity retention rate (%) | 71 | 78 | 78 | 84 | 74 |

As can be seen from Tables 3 and 4, all the batteries in Examples 1 to 4 had a maximum temperature of lower than 36° C., a time required to reach 80% of less than 49 minutes, a time required to reach 90% of less than 60 minutes, and a capacity retention rate of 83% or more. The results showed that Examples 1 to 4 were capable of suppressing the generation of heat by the batteries during charging, charging the batteries with high efficiency, and reducing the charging time without impairing the battery characteristics.

On the other hand, all the batteries in Comparative Example 1, in which the average charging current value B (referred to as a current value B in the following) was larger than the average charging current value A (referred to as a current value A in the following) and the average charging current value C (referred to as a current value C in the following), and Comparative Examples 2 and 3, in which the current value B was larger than the current value C, had a maximum temperature of higher than 41° C. and a capacity retention rate of 75% or less. The battery in Comparative Example 4, in which the current value B was larger than the current value A, had a time required to reach 80% of more than 49 minutes, a time required to reach 90% of more than 62 minutes, and a capacity retention rate of 78%. The battery in Comparative Example 5, in which the ratio $C_{MAX}/C_{MIN}$ was more than 3.00, had a maximum temperature of higher than 39° C. and a capacity retention rate of 78%. The battery in Comparative Example 6, in which the conventional standard CCCV charging was performed, had a time required to reach 80% of more than 49 minutes and a time required to reach 90% of more than 62 minutes. The battery in Comparative Example 7, in which the charging current was larger than that in the conventional standard CCCV charging, had a maximum temperature of higher than 41° C. and a capacity retention rate of 74%. The results showed that Comparative Examples 1 to 7 were inferior to Examples 1 to 4 in at least one of the maximum temperature, the time required to reach 80%, the time required to reach 90%, and the capacity retention rate.

INDUSTRIAL APPLICABILITY

According to the charging method and the charging control system for a lithium ion secondary battery of the present invention, the battery can be efficiently charged while a temperature rise of the battery is suppressed. Therefore, the charging method and the charging control system are useful for charging lithium ion secondary batteries that are suitable for any purpose and mounted on various types of mobile devices.

The invention claimed is:

1. A method for charging a lithium ion secondary battery comprising:
   a first step of charging the lithium ion secondary battery by increasing or decreasing a charging current until a predetermined set voltage is reached; and
   a second step of charging the lithium ion secondary battery that has reached the set voltage with a constant voltage while decreasing the charging current to maintain the set voltage,
   wherein, in the first step, $I_A$, $I_B$, and $I_C$ satisfy a relationship $I_A > I_B$ and $I_B < I_C$, where $I_A$ represents an average charging current value in a range where a state of charge (SOC) of the lithium ion secondary battery is 0% ≤ SOC < 40%, $I_B$ represents an average charging current value in a range where the state of charge is 40% ≤ SOC ≤ 60%, and $I_C$ represents an average charging current value in a range where the state of charge is 60% < SOC, and
   wherein, in the first step, a ratio of $I_{MAX}$ to $I_{MIN}$ ($I_{MAX}/I_{MIN}$) is 1.01 to 3.00, where $I_{MAX}$ represents a maximum value of the charging current value and $I_{MIN}$ represents a minimum value of the charging current value.

2. The method according to claim 1, wherein, in the first step, the minimum value $I_{MIN}$ is set in the range where the state of charge is 40% ≤ SOC ≤ 60%.

3. The method according to claim 1, wherein the maximum value $I_{MAX}$ is 0.4 C to 4.0 C, and the minimum value $I_{MIN}$ is 0.2 C to 2.0 C.

4. The method according to claim 1, wherein a negative electrode of the lithium ion secondary battery includes graphite as a negative electrode active material.

5. The method according to claim 4, wherein the negative electrode active material includes 40% by mass or more of the graphite.

6. The method according to claim 1, wherein, in the first step, the minimum value $I_{MIN}$ is set in the range where the state of charge is 40% ≤ SOC ≤ 60%, and
   the maximum value $I_{MAX}$ is 0.4 C to 4.0 C, and the minimum value $I_{MIN}$ is 0.2 C to 2.0 C.

7. The method according to claim 1, wherein, in the first step, the minimum value $I_{MIN}$ is set in the range where the state of charge is 40% ≤ SOC ≤ 60%,
   the maximum value $I_{MAX}$ is 0.4 C to 4.0 C, and the minimum value $I_{MIN}$ is 0.2 C to 2.0 C, and
   a negative electrode of the lithium ion secondary battery includes graphite as a negative electrode active material.

8. The method according to claim 7, wherein the negative electrode active material includes 40% by mass or more of the graphite.

9. A charging control apparatus for a lithium ion secondary battery, executing:
   a first step of charging the lithium ion secondary battery by increasing or decreasing a charging current until a predetermined set voltage is reached, and a second step of charging the lithium ion secondary battery that has reached the set voltage with a constant voltage while decreasing the charging current to maintain the set voltage, wherein, in the first step, $I_A$, $I_B$, and $I_C$ satisfy a relationship $I_A > I_B$ and $I_B < I_C$, where $I_A$ represents an average charging current value in a range where a state of charge (SOC) of the lithium ion secondary battery is 0%<SOC<40%, $I_B$ represents an average charging current value in a range where the state of charge is 40%≤SOC≤60%, and $I_C$ represents an average charging current value in a range where the state of charge is 60%<SOC, and wherein, in the first step, a ratio of $I_{MAX}$ to $I_{MIN}$ ($I_{MAX}/I_{MIN}$) is 1.01 to 3.00, where $I_{MAX}$ represents a maximum value of the charging current value and $I_{MIN}$ represents a minimum value of the charging current value.

10. The charging control apparatus according to claim 9, wherein, in the first step, the minimum value $I_{MIN}$ is set in the range where the state of charge is 40%≤SOC≤60%.

11. The charging control apparatus according to claim 9, wherein the maximum value $I_{MAX}$ is 0.4 C to 4.0 C, and the minimum value $I_{MIN}$ is 0.2 C to 2.0 C.

12. The charging control apparatus according to claim 9, wherein, in the first step, the minimum value $I_{MIN}$ is set in the range where the state of charge is 40% ≤SOC≤60%, and the maximum value $I_{MAX}$ is 0.4 C to 4.0 C, and the minimum value $I_{MIN}$ is 0.2 C to 2.0 C.

13. A battery pack comprising a charging control apparatus for a lithium ion secondary battery, the charging control apparatus for a lithium ion secondary battery, executing:

a first step of charging the lithium ion secondary battery by increasing or decreasing a charging current until a predetermined set voltage is reached, and a second step of charging the lithium ion secondary battery that has reached the set voltage with a constant voltage while decreasing the charging current to maintain the set voltage, wherein, in the first step, $I_A$, $I_B$, and $I_C$ satisfy a relationship $I_A > I_B$ and $I_B < I_C$, where $I_A$ represents an average charging current value in a range where a state of charge (SOC) of the lithium ion secondary battery is 0%≤SOC<40%, $I_B$ represents an average charging current value in a range where the state of charge is 40%≤SOC≤60%, and $I_C$ represents an average charging current value in a range where the state of charge is 60%<SOC, and wherein, in the first step, a ratio of $I_{MAX}$ to $I_{MIN}$ ($I_{MAX}/I_{MIN}$) is 1.01 to 3.00, where $I_{MAX}$ represents a maximum value of the charging current value and $I_{MIN}$ represents a minimum value of the charging current value.

\* \* \* \* \*